United States Patent [19]
Akstinat et al.

[11] Patent Number: 5,925,416
[45] Date of Patent: *Jul. 20, 1999

[54] METHOD FOR AFTER TREATMENT OF SURFACES OF CURED AND NON-CURED BINDER SUSPENSIONS WITH COLLOID SOLUTIONS

[75] Inventors: Manfred Akstinat, Zürich; Willi Suter, Stilli, both of Switzerland

[73] Assignee: Holderchem Holding AG, Zurich, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 08/750,085
[22] PCT Filed: Apr. 4, 1996
[86] PCT No.: PCT/IB96/00370
  § 371 Date: Dec. 6, 1996
  § 102(e) Date: Dec. 6, 1996
[87] PCT Pub. No.: WO96/31446
  PCT Pub. Date: Oct. 11, 1996

[30] Foreign Application Priority Data

Apr. 7, 1995 [AU] Australia .................. A 620/95

[51] Int. Cl.⁶ .............. B05D 3/00; C04B 40/04
[52] U.S. Cl. ............ 427/331; 106/638; 106/640; 106/819; 427/372.2; 427/383.1; 427/384; 427/385.5; 427/421; 427/428
[58] Field of Search .................. 106/638, 819, 106/640; 427/421, 428, 331, 372.2, 383.1, 384, 385.5

[56] References Cited

U.S. PATENT DOCUMENTS 1,859,253  5/1932  Cross ..................... 264/79
1,899,576  2/1933  Lemmerman et al. ............ 264/79
3,695,906  10/1972  McCune et al. ............ 106/637
4,871,594  10/1989  Bister et ................ 427/430.1
5,043,019  8/1991  Chervenak et al. .......... 106/612

FOREIGN PATENT DOCUMENTS 49-038919   4/1974  Japan .
53-049020   5/1978  Japan .
54-045333   4/1979  Japan .
54-082338   6/1979  Japan .
58-015059   1/1983  Japan .
59-232986  12/1984  Japan .

OTHER PUBLICATIONS

WPIDS Abstract No. 84–130952, abstract of Japanese Patent Specification No. 59–066482. Apr. 1984.

WPIDS Abstract No. 84–130953, abstract of Japanese Patent Specification No. 59–066483. Apr. 1984.

WPIDS Abstract No. 84–173051, abstract of Japanese Patent Specification No. 59–093788. May 1984.

Chemical Abstracts, vol. 81, N0. 10, Sep. 9, 1974, abstract no. 53763e, Xp002008584 & JP,A,49 038 919.

Chemical Abstracts, vol. 117, No. 10., Sep. 7, 1992, abstract no. 96300f, XP000375276 & CN.A.1 059 896.

*Primary Examiner*—Anthony Green
*Attorney, Agent, or Firm*—Pillsbury Madison & Sutro LLP

[57] ABSTRACT

Colloids of non-metals or metals, their oxides, hydroxides, oxihydrates and/or polymers (such as, e.g., heteropolyacids) are used in a method for reducing the susceptibility to fissuring in the curing of non-cured binder suspensions (such as, e.g., unset concrete, ready-mix) and for aftertreating already cured binder suspensions (such as, e.g., concrete).

7 Claims, No Drawings

METHOD FOR AFTER TREATMENT OF SURFACES OF CURED AND NON-CURED BINDER SUSPENSIONS WITH COLLOID SOLUTIONS

The invention relates to the use of colloid solutions of non-metals or metals, their oxides, hydroxides, oxihydrates and/or polymers (such as, e.g., heteropolyacids) for reducing the susceptibility to fissuring during the curing of non-cured binder suspensions (such as, e.g., unset concrete, ready mix) and for after treatment of cured binder suspensions (such as, e.g., concrete).

PRIOR ART

Binder systems prepared with water or other solvents are subjected to hydration and dehydration procedures during their first phase of curing that are difficult to control. Temperature fluctuations occurring during that period of time, like the structural transformations taking place during hydration, result in mechanical stresses,-wherein undesired volume changes/shrinking procedures frequently lead to the formation of fissures, separation or segregation phenomena and in the following bring about negative changes in the mechanical properties of the cured products.

In building practice it has, for instance, been known to limit evaporation losses and surface vicinity drying of unset concrete surfaces by feeding water. In addition to spraying water on unset concrete surfaces, it was, for instance, also proposed to apply organic solvents (e.g., glycols) or mineral or vegetable oils in order to form kind of a vapor barrier thereby preventing the uncontrolled evaporation of water. Such surface treatments suffer the disadvantage that the surface will be subjected to permanent changes (e.g., loss of strength) and, as a consequence, will frequently exhibit what is called an antiadhesive effect. The antiadhesive effect makes rendering difficult the application of further coatings and prevents permanent i bonding with consecutive layers or coatings.

SUMMARY OF THE INVENTION

The invention aims at a better control of the initial phase of the setting procedure and at ensuring success in subsequent surface treatments of cured or solidified binder suspensions (e.g. concrete). To solve this object, the invention proposes the use of the initially mentioned kind, wherein an accordingly dense and evaporation-preventing coating is provided due to the fact that gels are formed of the above-mentioned colloid solutions by appropriate additions or by the free $Ca(OH)_2$ of the concrete or also on account of the limited temporal stability of colloid. In the case of cured binder suspensions (e.g. concrete), restoration of formed microfissures is observed at such gel precipitations such that the permeability and mechanical stability of the surface will be substantially improved. By the fact that colloid solutions based on non-metals or metals, their oxides, hydroxides or oxyhydrates and/or polymers are used, an inorganic permanent surface layer is formed, which, as a consequence, cannot be thermally destroyed and, depending on the choice of the respective non-metals or metals, at the same time combines the mechanical improvement of the surfaces with the advantage that further -layers applied thereon can safely be connected with subjacent layers without development of an antiadhesion effect.

DETAILED DESCRIPTION OF A PREFERRED EMBODIMENT OF THE INVENTION

According to a preferred use, the colloid solutions are applied, in particular sprayed or rolled, on the surfaces of binder suspensions.

Suitable stabilization of the colloid solutions may be effected in order to adjust the desired time period until the formation of gels occurs, the use in that case advantageously being effected in a manner that the colloid solution employs mineral or biologically degradable additions. Stabilization in that case serves to control the point of time of gel formation in as precise a manner as possible by controlling gel formation by the addition of colloid stabilizing agents or agents favoring gel formation, wherein the desired effect of the colloid solutions is controlled by concertedly initiating or retarding gel formation. On the whole, known after treatment processes of unset binder surfaces (such as, for instance, applying wet cloths, foils or spraying water) may be obviated, since the colloid gel layer keeps the water balance of binder systems nearly constant over extended periods of time, thus enabling precise control.

The gels or reactions occurring on the surface will result in the formation of a drying-out or diffusion barrier, an increased strength and a reduced permeability in the surficial zones, reduced segregation, an improved processibility of liquid binder suspensions, an enhanced densification in the upper zones as well as an increased durability of the resulting solid body.

The use as suggested is of particular advantage especially in connection with self-curing systems in the fields of concrete and cement mortar, the manufacture of industrial floors by means of binder systems based on cements, gypsum, Sorel's cement, etc., the formation of roller-compacted surfaces by means of binder systems of various kinds and as a subsequent treatment of cured and/or as-cured concrete surfaces (i.e., to enhance durability, e.g., in the production of prefabricated elements).

Moreover, the colloid solutions suggested according to the invention may also be used for uncured surfaces of binder suspensions (such as, e.g., unset concrete, ready-mix) to enhance volume stability and prevent shrinking and fissuring as well as increasing durability by permeability reduction, reducing alkali aggregate reactions and improving the mechanical properties of hardened cement paste and reducing the waviness of surfaces.

What is claimed is:

1. A method for aftertreatment of surfaces of cured and non-cured binder suspensions to reduce susceptibility to fissuring comprising:
   applying a colloid solution coating to said surfaces, wherein said colloid solution is selected from the group consisting of colloid solutions of at least one of metal ornonmetal, oxides of metals and nonmetals, hydroxides of metals and nonmetals, oxihydrate of metals and nonmetals and heteropolyacids of metals and nonmetals; and inducing gel formation of the colloid solution after application of the colloid solution.

2. The method according to claim 1, wherein the colloid solution is sprayed on the surface.

3. The method according to claim 1, wherein the colloid solution is rolled on the surface.

4. The method according to claim 1, wherein the colloid solution includes a mineral or biologically degradable addition for stabilizing the colloid solution.

5. The method according to claim 1, wherein the colloid solution includes a stabilizing agent for adjusting a period of time for the gel formation.

6. A method for aftertreatment of surfaces of cured and non-cured binder suspensions to reduce susceptibility to fissuring comprising applying a colloid solution coating and an agent which controls gel formation to said surfaces wherein said colloid solution is selected from the group consisting of colloid solutions of at least one of metal or nonmetal, oxides of metals and nonmetals, hydroxides of metals and nonmetals, oxyhydrates of metals and nonmetals, and polymers; and inducing gel formation.

7. The method of claim 6, wherein said polymers are heteropolyacids.

* * * * *